Patented June 24, 1930

1,765,688

UNITED STATES PATENT OFFICE

RALPH H. McKEE AND CARROLL M. SALLS, OF NEW YORK, N. Y.

PROCESS OF MAKING SULPHURYL CHLORIDE

No Drawing.   Application filed June 26, 1923.   Serial No. 647,899.

This invention relates to processes of making sulphuryl chloride, and more particularly to improvements in the preparation of sulphuryl chloride from sulfur dioxid and chlorine.

It has heretofore been proposed to manufacture sulphuryl chloride by mixing liquid sulfur dioxid and liquid chlorine in the presence of camphor. The product is then distilled to separate the sulphuryl chloride from the camphor. This process is open to the objections, first, that it results in considerable loss of camphor and, second, that it is necessarily complicated due to the use of liquid sulfur dioxid and chlorine.

Another method of manufacturing sulphuryl chloride which has been proposed is to treat chlorosulfonic acid with a catalyzer to bring about its decomposition into sulphuryl chloride and sulfuric acid. After decomposition, the sulphuryl chloride is removed by distillation.

It has also been proposed to prepare sulphuryl chloride by alternately passing chlorine gas and sulfur dioxid through a body of wood charcoal. This method is not a continuous one and does not furnish good yields and is, therefore, not capable of adoption on a commercial scale.

The use of an active form of charcoal (character of activity unknown) to bring about a reaction between sulfur dioxid and chlorine gases and produce sulphuryl chloride has also been described but no efficient means have been provided for removing the heat evolved, and in such processes, it is necessary to have the chlorine and sulfur dioxid gases present in equal molecular quantities at all times, an excess of either constituent or presence of a third gas handicapping the process severely.

According to the present process, we pass dried sulfur dioxid and chlorine through a body of liquid sulphuryl chloride containing a catalyst, in the form of a dried active carbon in suspension. By providing a liquid medium to carry the catalyst, cooling may be efficiently accomplished and the presence of an excess amount of either gas for a limited period of time does not impair the efficiency of the process.

The catalyst preferred is one of the active forms of acid treated decolorizing carbons, such as that described and claimed in the patent to Ralph H. McKee, No. 1,133,049, granted March 23, 1915. To be of the highest activity, such carbons must be free from adsorbed moisture. The active absorbent carbons used for gas adsorption and war work, are of low value as catalysts for this reaction, but with a properly chosen catalyst of the type of the decolorizing carbon mentioned, the yield of sulphuryl chloride will be 200 pounds to 600 pounds per 24 hour day per ounce of catalyst used. Other catalysts, such as camphor, may be used but the yields are less and the active carbon of the type mentioned is the preferred catalyst.

A further advantage of the present process is that it may be employed in connection with impure gases which may be obtained at relatively low cost, such as sulfur burner gases containing from 14 to 16 per cent of sulfur dioxid and chlorine gas as it comes from the cells containing 80 per cent or more of chlorine.

In practicing the process when pure sulfur dioxid and chlorine are used, they are each dried separately by treating them with 66 degree Baumé sulfuric acid and are then mixed. If the drying is not perfect, a mist of sulfuric acid results after a time, which is removed in any desired manner, as by electrical precipitation or by passage through some type of absorption vessel. The dried gases are then run into a vessel containing liquid sulphuryl chloride carrying the catalyst in suspension. As stated, some form of dried acid treated decolorizing carbon and particularly the carbon described in the patent to Ralph H. McKee, No. 1,133,049, is preferred. The reaction is exothermic and the heat evolved may be removed by external cooling, by the use of cooling coils within the vessel or by removing a portion of the sulphuryl chloride, cooling it and then returning it to the vessel. After the process is completed, the catalyst is removed by filtration, furnishing a product of commercial quality. A single distillation gives sulphuryl chloride of complete purity.

The filtration may be carried out in the reaction vessel itself by the insertion or use of a porous plate or tube or other similar device. This obviates the removal of the catalyst and its exposure to the air during the filtration.

As stated, the above method may be used when approximately pure sulfur dioxide and chlorine are available. When sulfur burner gas containing from 14 to 16 per cent $SO_2$ and impure chlorine gas as it comes from the cells containing 80 per cent of free chlorine is employed, the process has to be modified somewhat, owing to the presence of large amounts of inert gases and their tendency to carry away large amounts of readily volatile sulphuryl chloride. When these impure gases are employed, they are preferably dried separately by contacting them with 66 degree Baumé sulfuric acid. The gases are then mixed and admitted through a mist removing device to remove any sulfuric acid fog. The dried gases are then passed through a reaction vessel or tower containing a suspension of the active carbon in sulphuryl chloride maintained at a temperature of 20° C. or below. The gases are then passed through a similar tower in which the temperature is maintained at about 0° C. by the use of refrigerating coils or other cooling mediums. The issuing gases are then freed from sulphuryl chloride vapors by passing them upwardly through an absorption tower, down which chlorosulfonic acid is passed. The chlorosulfonic acid absorbs the sulphuryl chloride vapor present and the inert gases, nitrogen, oxygen, sulfur dioxid, chlorine, and hydrochloric acid are not absorbed by the chlorosulfonic acid to any appreciable extent. A small amount of the chlorosulfonic acid is taken up by these inert gases and to remove this, the gases are passed through a short sulfuric acid absorption tower. The chlorine, hydrochloric acid, and possibly the sulfur dioxid may then be removed from the gases by passing the gases into an absorption tower flooded with either water or a water solution of sulfur dioxid. The tower or vessel to which the sulfur dioxide and chlorine are first delivered at a temperature of 20° C. may be omitted and the total production of sulphuryl chloride takes place in the second tower maintained at a temperature of 0°, but to do so will greatly increase the cost of refrigeration.

About two-thirds of sulphuryl chloride is formed in the first tower and the remaining third in the second tower. However, very little of the sulphuryl chloride formed will condense to liquid sulphuryl chloride in the first tower due to the presence of so much inert gas. About two-thirds of the sulphuryl chloride will condense in the second tower and the remainder will be absorbed by the chlorosulfonic acid absorption tower. It may be readily recovered by distilling the mixture coming off at the bottom of the tower and the residual chlorosulfonic acid is then returned to the tower for reuse. By properly arranging the chlorosulfonic acid absorption tower, the mixture coming off at the bottom of the tower may contain about 80 per cent sulphuryl chloride.

A slightly higher temperature, approximately 25° to 30° C. may be employed in the first tower and the reaction carried out by bringing the mixed $SO_2$ and chlorine gas into contact with the carbon and then cooling. In other words, the presence of liquid sulphuryl chloride in the first tower is not essential.

A further modification of the process consists in the use of a dry diluent, such as carbon tetrachlorid or pentachlorethane mixed with sulphuryl chloride as a means for suspending the active carbon in the towers. By using such a diluent, higher temperatures may be employed and refrigeration partially or entirely avoided. The use of such diluent, however, presents the additional requirement that the sulphuryl chloride must be separated from the diluent by distillation.

The rate of reaction and of absorption throughout the towers can be increased by the increase of pressure, but we prefer the use of approximately atmospheric pressure throughout the system. The use of a higher pressure necessitates the provision of means for preventing leaks and causes additional complications.

Sulfur dioxid and chlorine are each very soluble in sulphuryl chloride and by having a sufficiently large volume of sulphuryl chloride in the second absorption tower, an accumulation of an excess of either gas for an hour or two will not cause any difficulties. An hourly analysis of the material in the towers to determine its amount and thus permit readjustment of the gases is sufficient to properly carry out the process. This is a material advantage over similar prior processes wherein chlorine gas and sulfur dioxid gases have been brought together in the presence of a catalyst as it has been necessary to constantly feed the gases to the mixing chamber or vessel in approximately equal molecular quantities.

While we have described in detail the preferred practice of our process, it is to be understood that the details of procedure, and proportion of ingredients may be widely varied, and that known chemical equivalents, e. g., bromine in place of chlorine, may be employed in place of the materials mentioned, without departing from the spirit of the invention or the scope of the subjoined claims.

Having thus described our invention, we claim:

1. The process of making sulphuryl chloride which comprises passing chlorine gas and sulfur dioxid into a body of sulphuryl chloride containing a minor proportion of a catalyst in suspension.

2. The process of making sulphuryl halid which comprises passing the dried halogen gas and dried sulfur dioxid into a body of sulphuryl halid containing a minor proportion of a catalyst in suspension.

3. The process of making sulphuryl chloride which comprises passing chlorine gas and sulfur dioxid into a body of sulphuryl chloride diluted with an inert diluent and containing a catalyst in suspension.

4. The process of making sulphuryl chloride which comprises passing chlorine gas and sulfur dioxid into a body of sulphuryl chloride containing a minor proportion of a catalytic carbon in suspension.

5. The process of making sulphuryl chloride which comprises passing chlorine gas and sulfur dioxid into a body of sulphuryl chloride containing a minor proportion of a well dried catalytic carbon in suspension.

6. The process of making sulphuryl chloride which comprises passing chlorine gas and sulfur dioxid into a mixture of sulphuryl chloride and pentachlorethane containing a catalytic carbon in suspension.

7. The process of making sulphuryl chloride which comprises passing chlorine gas and sulfur dioxid into a body of sulphuryl chloride containing a minor proportion of a catalytic carbon in suspension, and cooling the body of sulphuryl chloride to remove the heat evolved and maintain a substantially constant temperature.

8. The process of making sulphuryl chloride which comprises passing chlorine gas and sulfur dioxid into a body of sulphuryl chloride and an inert diluent containing a catalytic carbon in suspension, and cooling the mixture of sulphuryl chloride and inert diluent to remove the heat evolved and maintain a substantially constant temperature.

9. The process of making sulphuryl chloride which comprises passing chlorine gas and sulfur dioxid into a body of sulphuryl chloride containing a catalyst consisting of an acid treated decolorizing carbon.

10. The process of making sulphuryl chloride which comprises passing chlorine gas and sulfur dioxid into a body of sulphuryl chloride containing a catalyst consisting of an acid treated decolorizing carbon free from adsorbed moisture.

11. The process of making sulphuryl chloride which comprises mixing a gas containing sulfur dioxid and a gas containing chlorine, passing the mixed gases through sulphuryl chloride containing a catalyst, and then passing the gases through an absorption tower in a counter current of chlorosulfonic acid to remove sulphuryl chloride vapors.

12. The process of making sulphuryl chloride which comprises mixing a gas containing sulfur dioxid and a gas containing chlorine, passing the mixed gases through sulphuryl chloride containing a catalyst, then passing the gases through an absorption tower in a counter current of chlorosulfonic acid to remove sulfuryl chloride vapors, and then passing the gases through an absorption tower in a counter current of sulfuric acid to recover chlorosulfonic acid absorbed by said gases.

13. The process of making sulphuryl chloride which comprises mixing damp chlorine gas and sulfur dioxid gas, removing the sulfuric acid mist formed, and passing the resulting dried gas mixture into a body of sulphuryl chloride containing a minor proportion of a catalyst in suspension.

14. The process of making sulphuryl chloride which comprises mixing a gas containing sulfur dioxid and a gas containing chlorine, passing the mixed gases into contact with a catalyst, and then passing the gases through an absorption tower in a counter current of chlorosulfonic acid to remove sulphuryl chloride vapors.

15. The process of making sulphuryl chloride which comprises mixing a gas containing sulfur dioxid and a gas containing chlorine, passing the mixed gases into contact with an acid treated carbon, and then passing the gases through an absorption tower in a counter current of chlorosulfonic acid to remove sulphuryl chloride vapors.

16. The process of making sulphuryl chloride which comprises mixing chlorine gas and sulfur dioxid, then passing the mixed gases into contact with a catalyst, then passing the gases through an absorption vessel in counter current to an absorbent to remove sulphuryl chloride vapors.

17. The process of making sulphuryl chloride which comprises mixing a dried gas containing sulphuryl chloride and a dried gas containing chlorine, passing the dried mixture into contact with a catalyst, removing a part of the sulphuryl chloride by chilling, passing the residual mixed gases through sulphuryl chloride containing a catalyst, then passing the gases through an absorption tower in a counter current of chlorosulfonic acid to remove sulphuryl chloride vapors, and then passing the gases through an absorption tower in a counter current of sulfuric acid to remove chlorosulfonic acid absorbed by said gases.

18. The process of making sulphuryl chloride which comprises mixing a gas containing sulfur dioxid and a gas containing chlorine, passing the mixed gases into contact with a dried acid treated active carbon, and then passing the gases through an absorption tower in a counter current of chlorosulfonic acid to remove sulphuryl chloride vapors.

19. The process of making sulphuryl chloride which comprises passing chlorine gas and sulphur dioxid mixed into contact with an acid treated active carbon, and then passing the gases through an absorption tower in a counter current of chlorosulfonic acid to remove sulphuryl chloride vapors.

In testimony whereof, we affix our signatures.

RALPH H. McKEE.
CARROLL M. SALLS.